(12) United States Patent
Burton et al.

(10) Patent No.: US 6,490,120 B1
(45) Date of Patent: Dec. 3, 2002

(54) SERVO GAIN OPTIMIZATION USING A VARIABLE CONVERGENCE FACTOR

(75) Inventors: Matthew C. Burton, Edmond, OK (US); Jason D. Gregg, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/352,461

(22) Filed: Jul. 13, 1999

Related U.S. Application Data

(63) Continuation-in-part of application No. 08/920,599, filed on Aug. 29, 1997, now Pat. No. 6,031,684
(60) Provisional application No. 60/092,614, filed on Jul. 13, 1998.

(51) Int. Cl.[7] ............................................. G11B 5/596
(52) U.S. Cl. ................................. 360/78.07; 360/78.09
(58) Field of Search .......................... 360/78.04, 78.06, 360/78.07, 78.09, 78.14

(56) References Cited

U.S. PATENT DOCUMENTS

| | | |
|---|---|---|
| 4,480,217 A | 10/1984 | Robbins et al. |
| 4,799,122 A | 1/1989 | Bremmer et al. |
| 4,835,633 A | 5/1989 | Edel et al. |
| 4,907,109 A | 3/1990 | Senio' |
| 4,937,689 A | 6/1990 | Seaver et al. |
| 4,942,564 A | 7/1990 | Hofer et al. |
| 4,965,501 A | 10/1990 | Hashimoto |
| 5,182,684 A | 1/1993 | Thomas et al. |
| 5,241,433 A | 8/1993 | Anderson et al. |
| 5,262,907 A | 11/1993 | Duffy et al. |
| 5,276,662 A | 1/1994 | Shaver et al. |
| 5,381,282 A | 1/1995 | Arai et al. |
| 5,416,759 A | 5/1995 | Chun |
| 5,465,183 A | 11/1995 | Hattori |
| 5,585,976 A | 12/1996 | Pham |
| 5,631,999 A | 5/1997 | Dinsmore |
| 5,659,438 A | 8/1997 | Sasamoto et al. |
| 5,680,272 A | 10/1997 | Kedlec et al. |
| 5,708,581 A | 1/1998 | Martinez |
| 5,748,591 A | 5/1998 | Hidekazu |
| 5,774,299 A * | 6/1998 | Baum et al. ............. 360/77.08 |
| 5,781,365 A | 7/1998 | Romano et al. |
| 5,822,147 A | 10/1998 | Kisaka |
| 5,835,302 A | 11/1998 | Funches et al. |
| 5,886,846 A | 3/1999 | Pham et al. |
| 5,898,286 A | 4/1999 | Clare et al. |
| 5,926,338 A | 7/1999 | Jeon et al. |
| 5,940,239 A | 8/1999 | Lee et al. |
| 5,949,605 A | 9/1999 | Lee et al. |
| 5,949,608 A | 9/1999 | Hunter |
| 5,956,201 A | 9/1999 | Pham et al. |
| 5,969,494 A | 10/1999 | Ottesen |
| 5,999,361 A | 12/1999 | Kim |
| 6,013,995 A | 1/2000 | Kim |
| 6,031,684 A * | 2/2000 | Gregg ..................... 360/78.06 |

* cited by examiner

Primary Examiner—Andrew L. Sniezek
(74) Attorney, Agent, or Firm—Fellers, Snider, et al.

(57) ABSTRACT

Apparatus and method for optimizing a gain of a disc drive servo circuit, the gain used to control the magnitude of current applied by the servo circuit to a voice coil motor to position a head adjacent tracks of a disc. The servo circuit includes a servo processor which selects an initial value of the gain, and then proceeds to perform a gain convergence operation wherein the head is repeatedly moved across the disc over a number of passes and position error is accumulated during each pass. The accumulated position error is used along with a scale factor to converge the gain from an initial gain value to a final, optimal gain value. The scale factor is variable and is also converged over the successive number of passes from an initial value to a final, nominal value, in order to decrease the time required to obtain the final, optimal gain value.

10 Claims, 9 Drawing Sheets

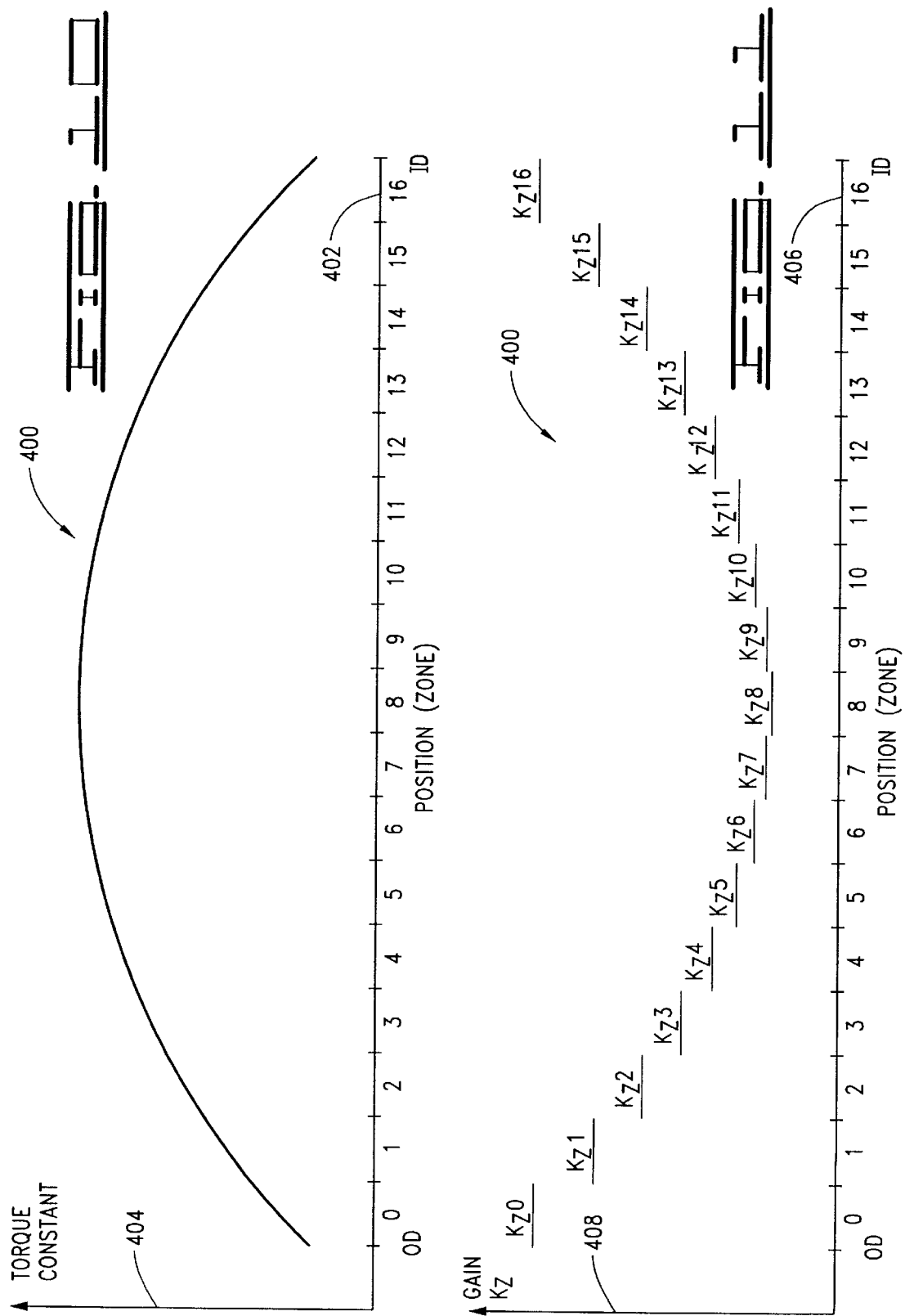

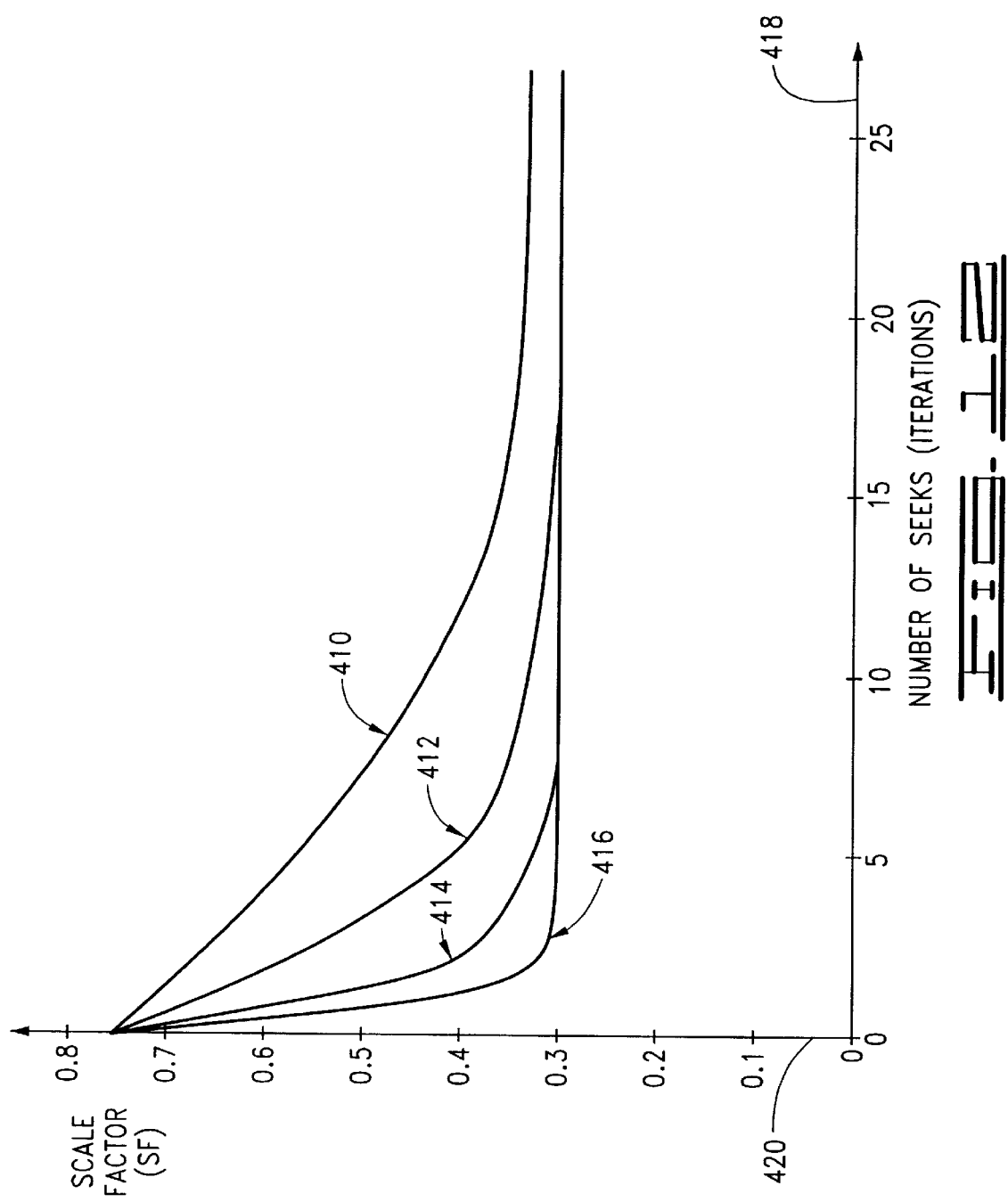

SERVO GAIN OPTIMIZATION USING A VARIABLE CONVERGENCE FACTOR

RELATED APPLICATIONS

This application is a continuation-in-part of U.S. patent application Ser. No. 08/920,599 filed Aug. 29, 1997, now U.S. Pat. No. 6,031,684, and claims priority to U.S. Provisional Application No. 60/092,614 filed Jul. 13, 1998.

FIELD OF THE INVENTION

This invention relates generally to the field of disc drive storage devices, and more particularly, but not by way of limitation, to improving the operational response of a disc drive servo system by reducing the time required to converge to an optimal gain for use by the servo system to control magnitude of current applied to a voice coil motor of the disc drive to effect head positional control, the rate of convergence of the gain controlled by a variable convergence factor.

BACKGROUND OF THE INVENTION

Hard disc drives are commonly used as the primary data storage and retrieval devices in modern computer systems. In a typical disc drive, the data are magnetically stored on one or more discs that are rotated at a constant high speed and accessed by a rotary actuator assembly having a plurality of read/write heads that fly adjacent the surfaces of the discs. A read channel and interface circuit are provided to recover previously stored data from the discs to the host computer.

A closed loop digital servo system such as disclosed in U.S. Pat. No. 5,262,907 issued Nov. 16, 1993 to Duffy et al., assigned to the assignee of the present invention, is typically used to control the position of the heads relative to tracks on the discs. The tracks are defined from servo information that is written to the surfaces of the discs during manufacturing. The servo system of a disc drive thus utilizes the servo information in the performance of two primary operations: seeking and track following.

Seeking entails the movement of a selected head from an initial track to a destination track. For seeks of a sufficient length, a velocity-control approach is typically employed wherein the velocity of the head is repetitively determined and compared to a velocity profile which defines an optimum velocity trajectory for the head as it moves to the target track. The amount of current applied to an actuator coil varies in proportion to the velocity error, the actuator coil being part of a voice coil motor used to control the position of the head.

Track following entails the continued positioning of a selected head over a corresponding, selected track. A position-control approach is typically employed wherein the relative position of the head with respect to the center of the track is determined and compared to a desired position for the head. The resulting position error is used to control the amount of current that is applied to the actuator coil in order to maintain the head at the desired position relative to the track.

As will be recognized, modern disc drives typically employ an embedded servo scheme wherein the servo information is angularly spaced and interspersed among user data fields (or "sectors") on the surfaces of the discs. However, the sampling rate of the servo information is typically insufficient to provide the gain necessary to maintain the heads within predetermined off track boundaries.

Accordingly, a multi-rate observer is deployed to provide estimates of head position, velocity and bias at times when the heads are disposed over the user data fields. Thus, the servo system utilizes position information obtained from the discs to provide the observer with the input required to give estimates for controlling the movement of the heads during seeking and track following. Such observers (or "estimators") are well known in the art and are discussed, for example, in U.S. Pat. No. 5,585,976 issued Dec. 17, 1996 to Pham, assigned to the assignee of the present invention.

A continuing trend in the disc drive industry is to provide disc drives with ever increasing data storage and transfer rate capacities. Some disc drives of the current generation have track densities greater than about 7,000 tracks per centimeter (about 18,000 tracks per inch). As track densities continue to increase, it becomes increasingly important to provide servo systems that are capable of accurately positioning the heads during seeks and track following modes of operation. Various gains of the servo system are typically selected to achieve a certain control response for the servo system; however, changes in environmental conditions and other factors tend to affect the characteristics of the servo system during operation.

While efforts in the prior art to adapt the operational characteristics of disc drive servo systems in view of changing environmental conditions have been successful, there is a continual need for improvements whereby servo system performance can be enhanced in view of further advancements in the art, such as continued increases in disc drive track densities.

SUMMARY OF THE INVENTION

The present invention is directed to an apparatus and method for optimizing servo gain in a disc drive.

In accordance with preferred embodiments, a disc drive includes a head adjacent a recording surface of a rotatable disc and a voice coil motor which is coupled to the head. A servo circuit applies current to the voice coil motor to controllably position the head with respect to the recording surface, the servo circuit comprising a servo processor which utilizes an internal gain to control a magnitude of the current.

The servo processor optimizes the internal gain by selecting an initial value of gain for the internal gain. Next, a gain convergence operation is performed which comprises repeatedly positioning the head and accumulating position error over a successive number of passes to iteratively converge the internal gain from the initial value of gain to a final value of gain which provides optimal performance by the servo circuit. The gain convergence operation utilizes a scale factor during each of the successive number of passes, with the scale factor also being iteratively converged over the successive number of passes from an initial value to a final, nominal value.

Significantly, by using a large initial value for the scale factor, the gain can be moved quickly from the initial value to near the final value; thereafter, using smaller values for the scale factor allows the gain to quickly and smoothly transition to the final value.

A new value for the scale factor is determined during each successive pass during the gain convergence operation in relation to a combination of a previous value for the scale factor during a previous pass, and a product of a convergence constant and a difference between the nominal value for the scale factor and the previous value for the scale factor. The magnitude of the convergence constant controls the rate of convergence of the scale factor from the initial value to the nominal value, and hence the rate of convergence of the gain from the initial value of gain to the final value of gain.

The final value of gain is a base gain which is further adapted to account for variations in torque capability of the voice coil motor. Preferably, the disc recording surface is divided into a number of concentric zones with each zone comprising a plurality of tracks. The servo processor proceeds to determine a torque capability factor for each zone which is inversely proportional to torque capability of the voice coil motor in each zone.

Next, the servo processor obtains a zone servo gain which is used for each zone in relation to a combination of the base servo gain and the associated torque capability factor, the zone servo gain used to control the magnitude of the current applied to the voice coil motor. Because magnetic flux density of the voice coil motor is typically lower near edges of permanent magnets of the motor and higher near intermediate portions of the magnets, the zone servo gain for zones disposed near innermost and outermost diameters of the recording surface are greater than the zone servo gain for zones disposed near intermediate portions of the recording surface.

Further, the gain convergence operation wherein the head is repetitively moved across the recording surface is preferably characterized as comprising a number of successively performed model reference seeks, which comprise short seeks (typically 100 tracks or less). Each model reference seek utilizes a reference current signal indicative of the current to be applied to the voice coil motor having a shape characterized as a modified one minus cosine waveform.

These and various other features as well as advantages which characterize the present invention will be apparent from a reading of the following detailed description and a review of the associated drawings.

BRIEF DESCRIPTION OF THE DRAWINGS

FIG. 6 shows a flow chart for a disc drive seek routine carried out in accordance with the preferred embodiment of the present invention and is representative of programming utilized by the servo processor of FIG. 3.

FIG. 10 is a graphical representation of a torque constant curve for the voice coil motor of the disc drive of FIG. 1.

FIG. 11 provides a graphical representation of corresponding Kz gains by zone.

FIG. 12 is a graphical representation of the convergence of the scale factor from an initial value to a final, nominal value using various convergence constants, in accordance with preferred embodiments of the present invention.

DETAILED DESCRIPTION

In order to provide a detailed description of various preferred embodiments of the present invention, it will be helpful to first review the construction and operation of a disc drive 100, and then to discuss a particularly useful type of seek referred to as a "model reference seek." Thereafter, the discussion will turn to the adaptive selection of gains used by the servo circuit of the disc drive using a variable convergence scale factor, in accordance with preferred embodiments.

Overview of Disc Drive

Figure 1:
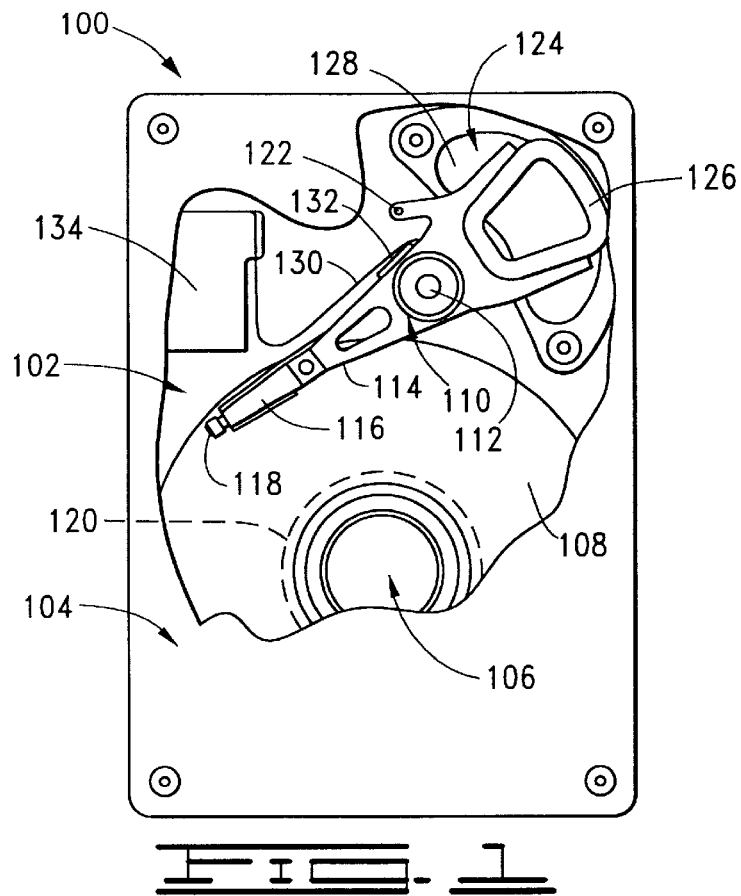
FIG. 1 shows a top plan view of a disc drive constructed in accordance with the preferred embodiment of the present invention.

Referring to FIG. 1, the disc drive 100 includes a base deck 102 to which various components of the disc drive 100 are mounted. A top cover 104 (shown in partial cutaway fashion) cooperates with the base deck 102 to form an internal, sealed environment for the disc drive in a conventional manner.

A spindle motor (shown generally at 106) is provided to rotate one or more discs 108 at a constant high speed (such as 10,000 revolutions per minute). User data are written to and read from tracks (not designated) on the discs 108 through the use of an actuator assembly 110, which rotates about a bearing shaft assembly 112 positioned adjacent the discs 108. The actuator assembly 110 includes a plurality of actuator arms 114 which extend toward the discs 108, with one or more flexures 116 extending from the actuator arms 114. Mounted at the distal end of each of the flexures 116 is a head 118 which includes a slider assembly (not separately designated) designed to fly in close proximity to the corresponding surface of the associated disc 108.

When the disc drive 100 is not in use, the heads 118 are moved over landing zones 120 near the inner diameter of the discs 108 and the actuator assembly 110 is secured using a conventional latch arrangement, such as designated at 122.

The radial position of the heads 118 is controlled through the use of a voice coil motor (VCM) 124, which includes a coil 126 attached to the actuator assembly 110 as well as a permanent magnet 128 which establishes a magnetic field in which the coil 126 is immersed. As will be recognized, a second magnetic flux path is disposed above the permanent magnet 128, but has not been shown for purposes of clarity.

The controlled application of current to the coil 126 causes magnetic interaction between the permanent magnet 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly 130 includes a printed circuit board 132 to which head wires (not shown) are connected, the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
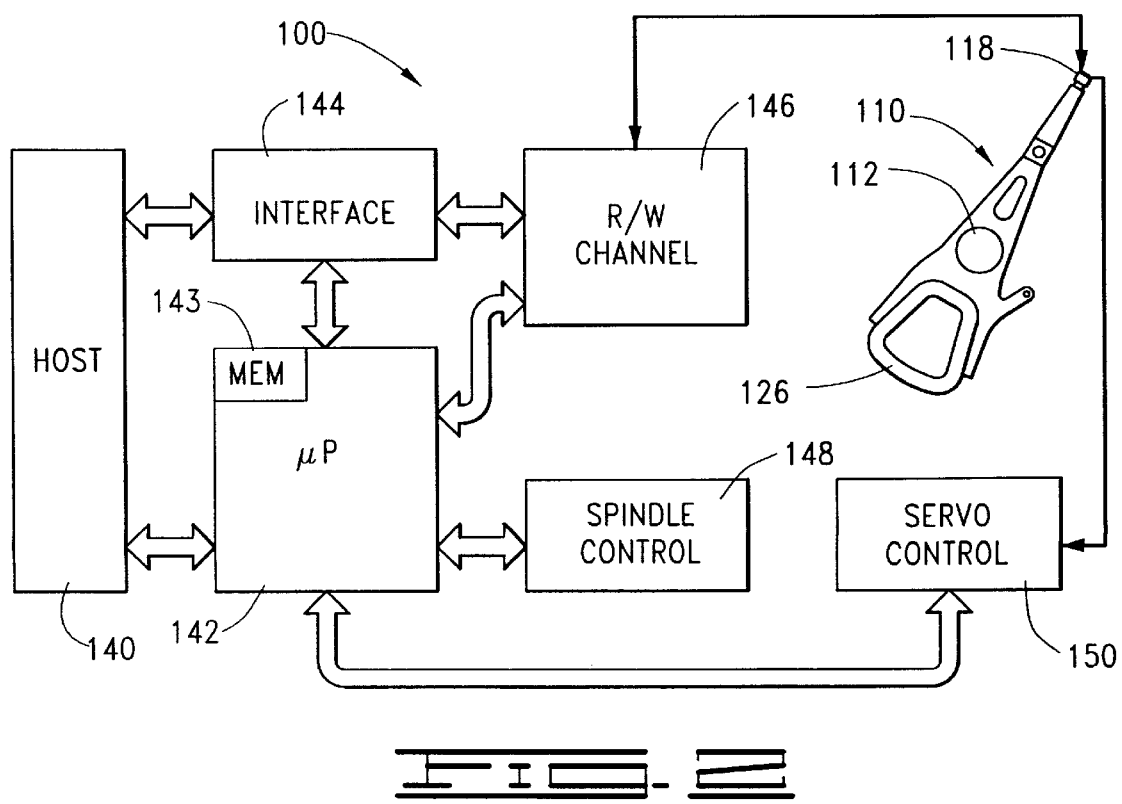
FIG. 2 provides a functional block diagram of the disc drive of FIG. 1 operably connected to a host computer in which the disc drive is mounted.

Referring now to FIG. 2, shown therein is a functional block diagram of the disc drive 100 of FIG. 1, generally showing the main functional circuits which are resident on the disc drive printed circuit board and used to control the operation of the disc drive 100.

The disc drive 100 is shown to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming stored in microprocessor memory (MEM) 143. The MEM 143 can include random access memory (RAM), read-only memory (ROM) and other sources of resident memory for the microprocessor 142.

Data are transferred between the host computer 140 and the disc drive 100 by way of a disc drive interface 144, which includes a buffer to facilitate high speed data transfer between the host computer 140 and the disc drive 100. Data to be written to the disc drive 100 are thus passed from the host computer to the interface 144 and then to a read/write channel 146, which encodes and serializes the data and provides the requisite write current signals to the heads 118. To retrieve data that have been previously stored by the disc drive 100, read signals are generated by the heads 118 and provided to the read/write channel 146, which performs decoding and error detection and correction operations and outputs the retrieved data to the interface 144 for subsequent transfer to the host computer 140. Such operation of the disc drive 100 is well known in the art and discussed, for example, in U.S. Pat. No. 5,276,662 issued Jan. 4, 1994 to Shaver et al., assigned to the assignee of the present invention.

The discs 108 are rotated by a spindle control circuit 148, which electrically commutates the spindle motor 106 (FIG. 1) through the use of back electromotive force (bemf) sensing. Spindle control circuits such as represented at 148 are well known and are discussed, for example, in U.S. Pat. No. 5,631,999 issued May 20, 1997 to Dinsmore, assigned to the assignee of the present invention.

As discussed above, the radial position of the heads 118 is controlled through the application of current to the coil 126 of the actuator assembly 110. Such control is provided by a servo control circuit 150, a functional block diagram of which is provided in FIG. 3.

With continued reference to FIG. 3, the servo control circuit 150 includes a preamp circuit 152, a servo data and decode circuit 154, a servo processor 156 with associated servo RAM 158 and a VCM control circuit 160, all of which cooperate in a manner to be discussed in greater detail below to control the position of the head 118. For reference, the preamp circuit 152 is typically located on the printed circuit board 132 (FIG. 1) as it has been found to be generally advantageous to locate the preamp circuit 152 in close proximity to the heads 118.

The servo processor 156 determines head position error from the relative magnitudes of the digital representations of the burst signals and, in accordance with commands received from the disc drive microprocessor 142 (FIG. 2), determines the desired position of the head 118 with respect to the disc 108. In response, the servo processor 156 outputs a current command signal to the VCM control circuit 160, which includes an actuator driver that applies current of a selected magnitude and direction to the coil 126 in response to the current command signal.

The servo information on the discs 108 is recorded during the manufacturing of the disc drive 100 using a highly precise servo track writer. The servo information serves to define the boundaries of each of the tracks and is divided circumferentially into a number of frames, with user data fields disposed therebetween. Because the sampling rate of the servo frames is generally insufficient to adequately control the positioning of the head 118, as described below a multi-rate observer is additionally deployed to provide estimates of head position, velocity and bias force so that corrections can be made in the positioning of the head 118 at times when the head 118 is over the user data fields between each pair of successive servo frames.

Figure 3:
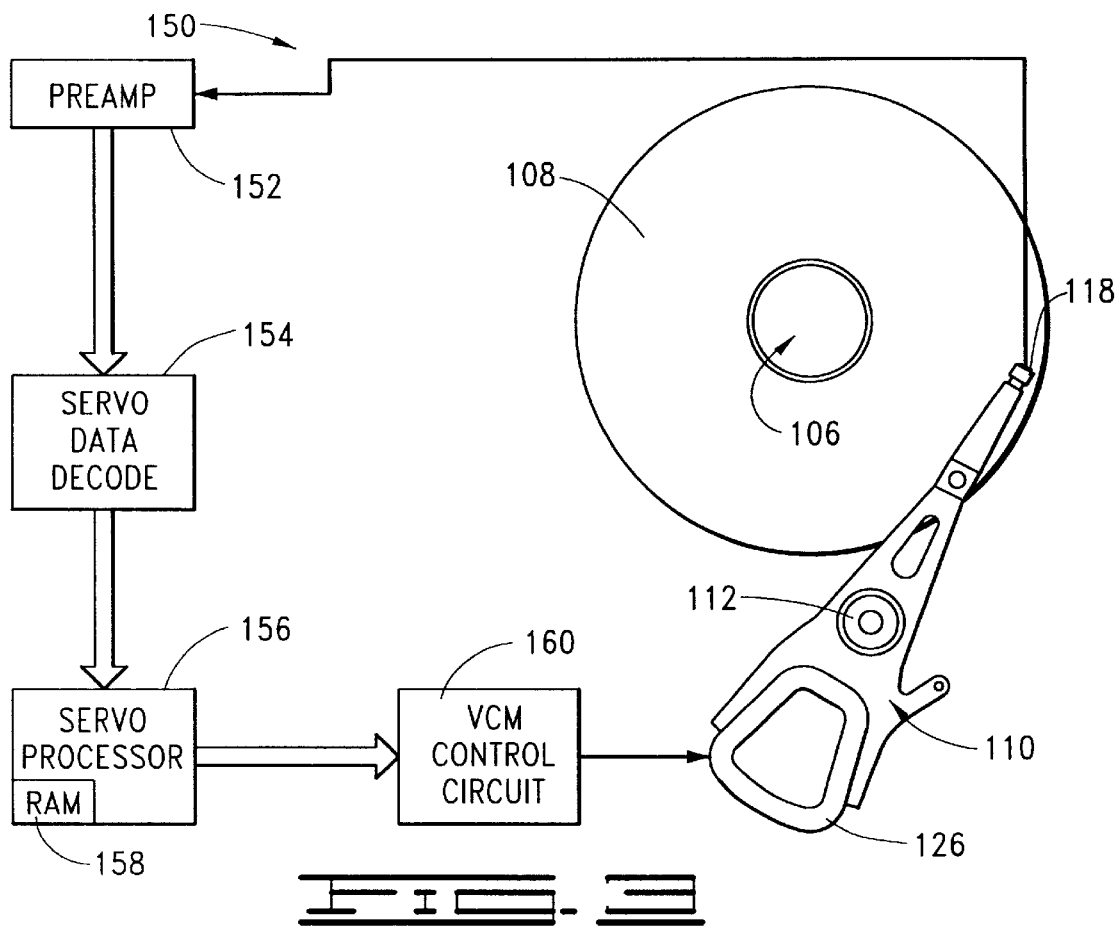
FIG. 3 provides a functional block diagram of a servo control circuit shown in FIG. 2.
Figure 4:
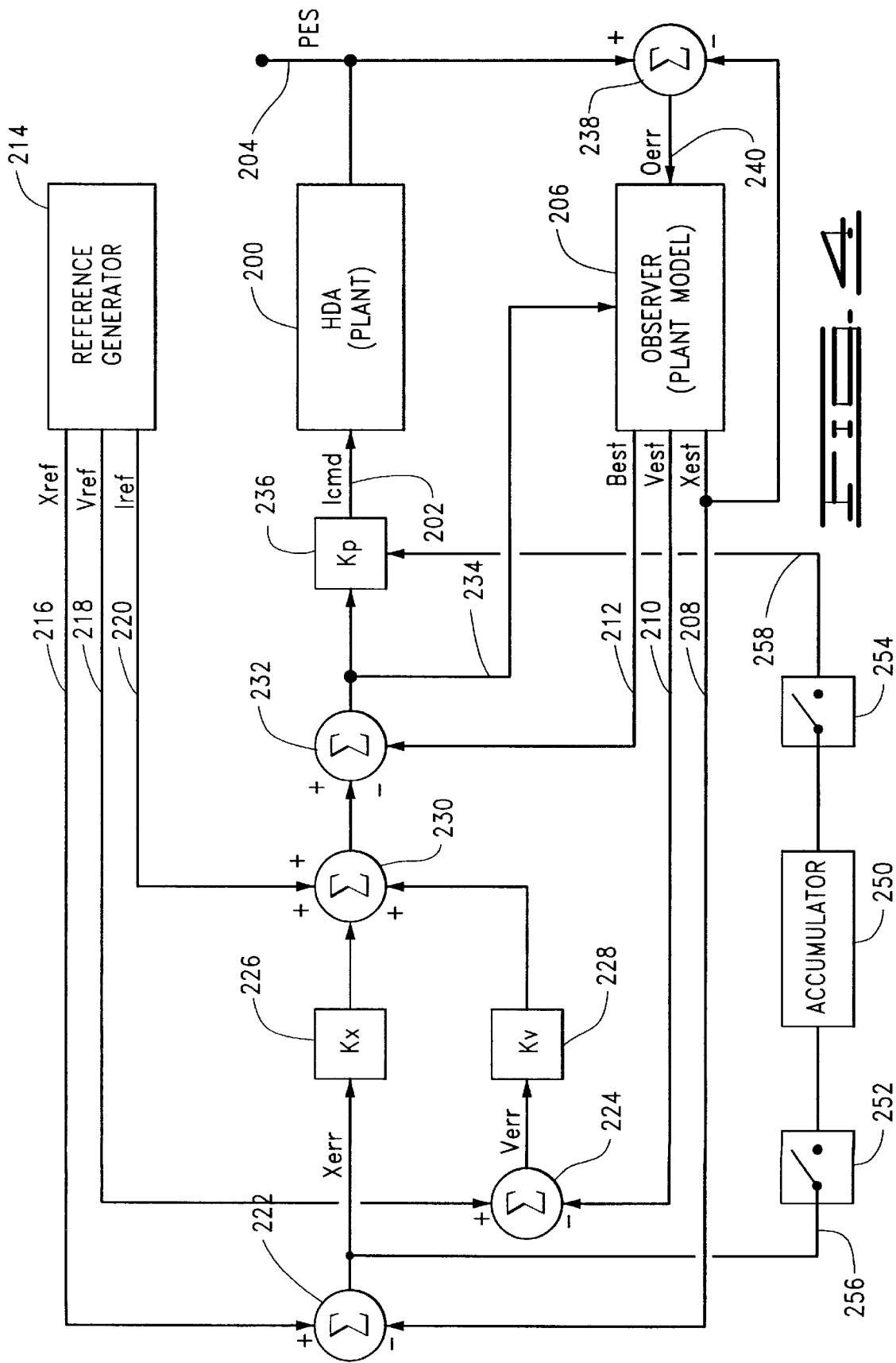
FIG. 4 is a control diagram for the disc drive servo control circuit of the disc drive of FIG. 1, portions of which are representative of functions carried out by the servo processor of FIG. 3.
Figure 5:
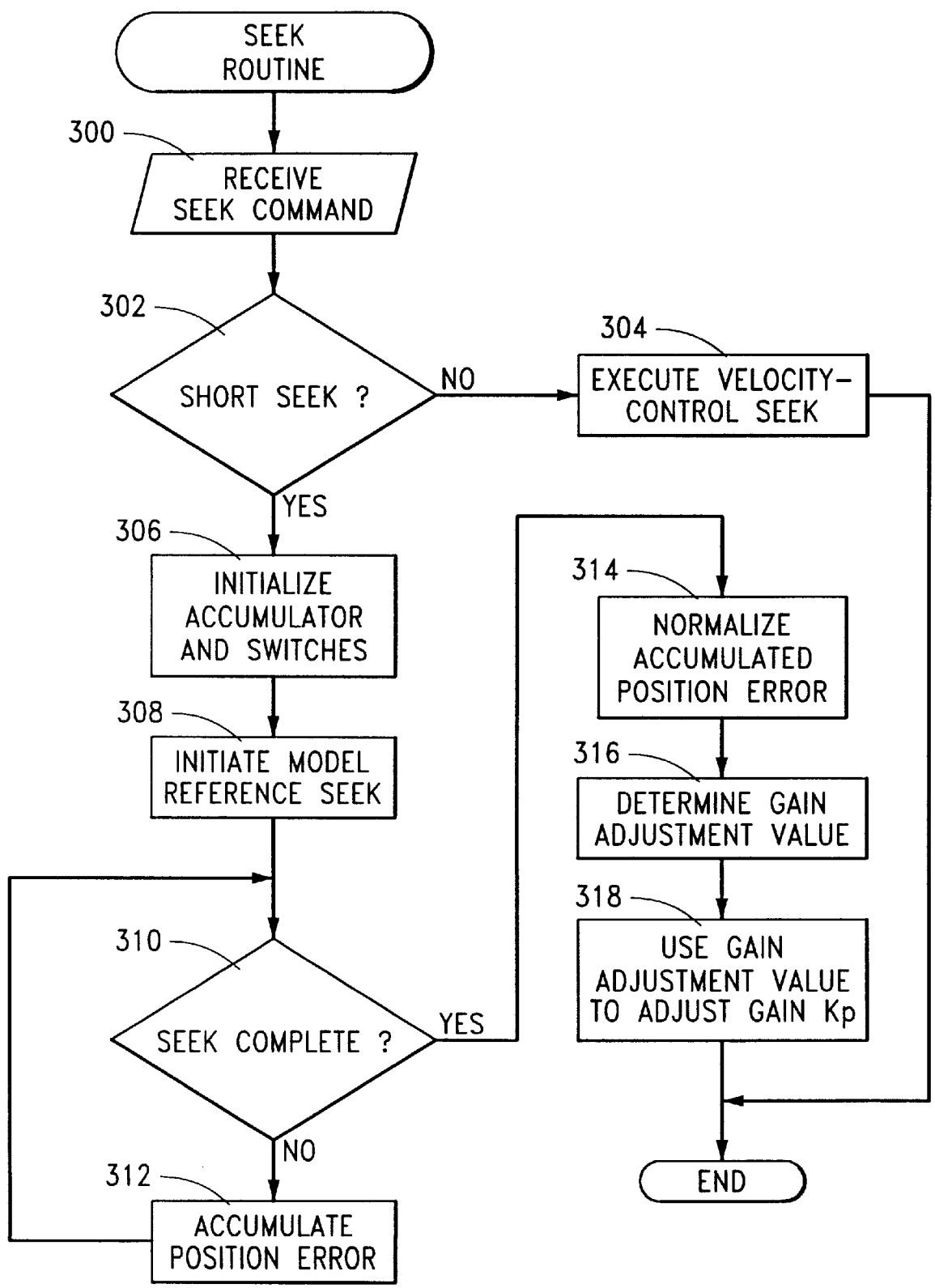

Referring now to FIG. 4, shown therein is a generalized control diagram for the servo circuit 150 of FIG. 3. Portions of the control diagram of FIG. 4 can be readily implemented through appropriate programming utilized by the servo processor 156.

As shown in FIG. 4, a portion of the disc drive 100 referred to as the "plant" is denoted by block 200 and generally comprises the servo circuit 150, the actuator assembly 110, a selected head 118 and the corresponding disc 108. The plant 200 receives a current command signal ("Icmd") on signal path 202 to position the head 118 adjacent a selected track. In response to servo information on the track, the plant 200 generates a position error signal (PES) which is output on signal path 204.

The control diagram of FIG. 4 also shows a multi-rate observer 206, or plant model, which is designed to have the same nominal input/output response characteristics as the plant 200. As will be recognized by those skilled in the art, the observer 206 generates a position estimate ("Xest"), a velocity estimate ("Vest") and a bias estimate ("Best") on signal paths 208, 210 and 212, respectively, which correspond to estimates of head position, head velocity and bias force. The bias force estimate takes into account spring forces exerted upon the actuator as a result of the flexure assembly (such as 130 of FIG. 1) and windage forces upon the heads and is indicative of the amount of current required to maintain the selected head at the current position in view of such forces.

Additionally, a reference generator 214 is provided which provides position reference ("Xref"), velocity reference ("Vref") and current reference ("Iref") signals indicative of the desired position, velocity and current settings for the plant 200. These signals are output on paths 216, 218 and 220, respectively and have values which generally depend upon the particular operational mode of the servo circuit, such as track following or seeking. As will be recognized, the current reference Iref is typically provided with a value of zero during track following, but as discussed below takes both positive and negative values during certain types of seeks in order to first accelerate and then decelerate the heads 118 from the initial track to the destination track.

A summing junction 222 determines a position error ("Xerr") as the difference between the position reference Xref and the position estimate Xest. Similarly, a summing junction 224 determines a velocity error ("Verr") as the difference between the velocity reference Vref and the velocity estimate Vest. The position error Xerr is provided to a gain block 226 having a scalar gain of Kx and the velocity error Verr is provided to a gain block 228 having a scalar gain of Kv, so that the output quantities are summed by a summing junction 230 (along with the current reference Iref).

The output of the summing junction 230 is further summed with the bias estimate Best at a summing junction 232, as shown. The output of the summing junction 232 is provided on signal path 234 as a control input to the observer 206 and is indicative of the amount of current to be applied to the plant 200.

The output of the summing junction 232 is further provided to a gain block 236 having a gain Kp, so that the output thereof comprises the current command Icmd signal on path 202. The gain block 236 provides the primary gain for the servo circuit 150 and is intended to ensure that the operational characteristics of the observer 206 closely model the characteristics of the plant 200. This will be discussed in greater detail in the next section.

The PES on signal path 204 is summed with the position estimate Xest on path 208 by a summing junction 238 to generate an observer error ("Oerr") signal as an input to the observer 206 on path 240. For reference, the observer 206 is a 4X observer, in that four sets of estimated parameters are output on the paths 208, 210 and 212 for each input of the observer error Oerr signal. Thus, the observer provides a multi-rate of four times the sampling rate of the servo information from the discs 108.

Finally, an accumulator block 250 (also referred to as an "integrator" or "1/s" block) is additionally provided in the control diagram of FIG. 4, along with switches 252 and 254 which are provided in series with the accumulator block 250 and control the input of the position error Xerr (along path 256), as well as the output of an updated gain Kp (along path 258) to the gain block 236, as explained below.

Model Reference Seeks

As provided above, a particularly useful seek methodology for use in accordance with preferred embodiments of the present invention is referred to as a model reference seek, which is used by the disc drive 100 to move the selected head 118 a relatively short seek distance (i.e., 100 tracks or less).

Figure 5:
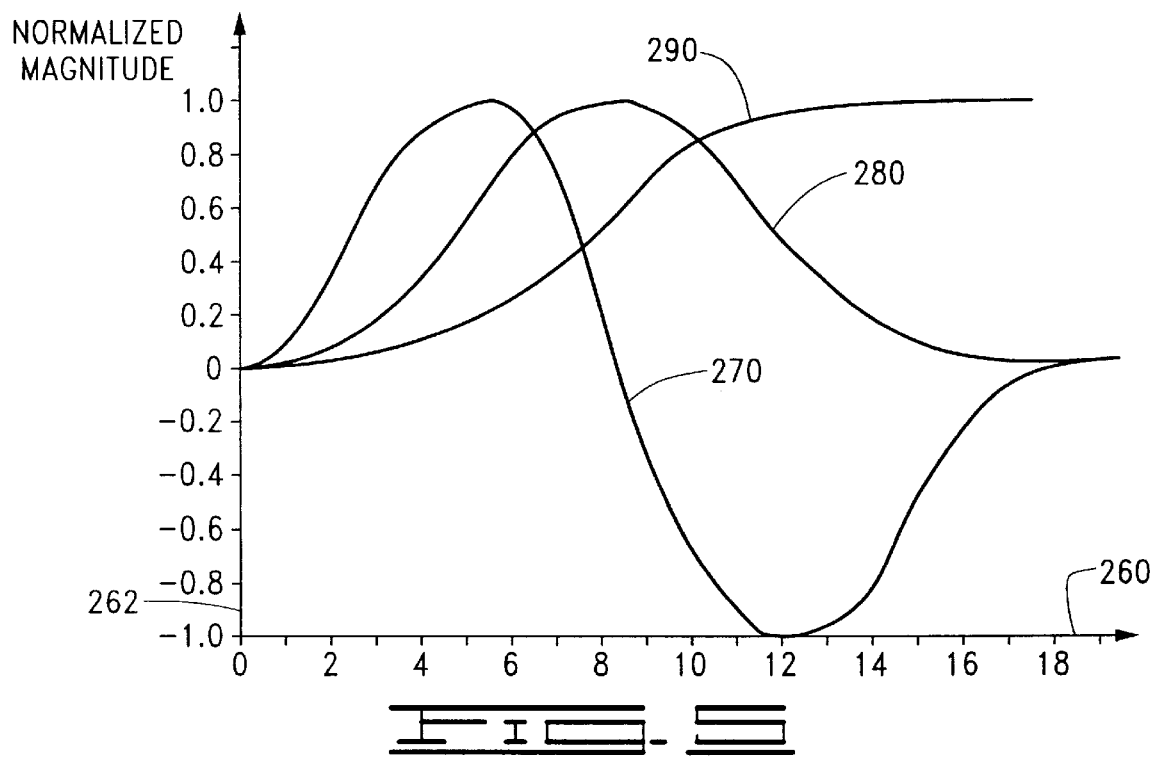
FIG. 5 provides graphical representations of reference current, velocity and position signals output by the reference generator of FIG. 4 during a model reference seek in accordance with the preferred embodiment of the present invention.

A model reference seek is performed using a modified one minus cosine (1-cos) reference current signal which is scaled to each particular seek length (i.e., the number of tracks in the seek). Referring to FIG. 5, shown therein is a set of reference current, velocity and position curves for a model reference seek, plotted against an x-axis 260 indicative of time (in units corresponding to the multi-rate period) and a y-axis 262 indicative of relative magnitude (normalized over a range of from −1 to +1).

As shown in FIG. 5, current curve 270 corresponds to the discrete values of the reference current signal Iref output by the reference generator 214 (FIG. 4) during the model reference seek on path 220. In like manner, velocity curve 280 corresponds to the reference velocity signal Vref output on path 218 and position curve 290 corresponds to the reference position signal Xref output on path 216.

The discrete reference current values of the current curve 270 can be readily determined using the following equations:

$$Iref = \frac{1}{2}\left(1 - \cos\left(\frac{(n \bmod N)\pi}{N}\right)\right)\Big|_{n=0}^{n=N-1} \qquad (1)$$

$$Iref = \cos\left(\frac{(n \bmod N)\pi}{N}\right)\Big|_{n=N}^{n=2N-1} \qquad (2)$$

$$Iref = \frac{1}{2}\left(-1 - \cos\left(\frac{(n \bmod N)\pi}{N}\right)\right)\Big|_{n=2N}^{n=3N-1} \qquad (3)$$

where n is the multi-rate period, N is a predetermined number associated with the desired duration of the model reference seek (and is equal to six in the example set forth by FIG. 5), and mod is a modulus operator which calculates the remainder of the quotient N/n. As will be recognized, the reference current curve 270 can be readily obtained from equations (1)–(3). Thereafter, the reference velocity curve 280 of FIG. 5 can be obtained by taking the integral of the reference current curve 270 and the reference position curve 290 can be obtained by taking the integral of the reference velocity curve 280.

Referring to FIG. 6, shown therein is a flow chart for a disc drive seek routine, generally illustrating the operation of the servo circuit 150 in accordance with the preferred embodiment. It will be recognized that the flow chart of FIG. 6 corresponds to the control diagram of FIG. 4 and is representative of programming utilized by the servo processor 156. It is contemplated that the routine of FIG. 6 will be executed for each seek performed by the disc drive 100.

Beginning at block 300, the servo processor 156 first receives a seek command from the system microprocessor 142, in which the processor 156 is instructed to move a selected head 118 from the existing track to a destination track. The routine determines the length of the seek in terms of the number of tracks to the destination track in order to determine whether the distance to be traveled falls within the model reference seek threshold (i.e., whether the seek is a "short seek"), as indicated by decision block 302.

As mentioned above, the maximum distance for a model reference seek in the preferred embodiment is 100 tracks. It will thus be recognized seeks longer than 100 tracks are performed using a conventional velocity-control methodology. It has been found desirable to transition from short to long seeks at a seek length where the velocity-control methodology achieves a shorter overall seek time than the model reference seek methodology, so the actual threshold will depend upon the characteristics of a particular drive.

Accordingly, with reference to the routine of FIG. 6, if the destination track is more than 100 tracks away from the initial track, the routine passes from decision block 302 to block 304, wherein the disc drive 100 performs a conventional velocity-control seek. For additional discussion regarding velocity-control seeks, see the previously referenced Duffy et al. U.S. Pat. No. 5,262,907.

When the seek is a short seek, however, the routine passes from decision block 302 to block 306, wherein the accumulator 250 is initialized to a zero count, switch 252 is closed and switch 254 is opened. It is contemplated that the accumulator 250 and the switches 252 and 254 will be embodied in software (firmware), so it will be readily understood that block 306 operates to prepare for the accumulation of the position error Xerr while isolating this accumulation function from the gain Kp of the gain block 236.

Continuing with FIG. 6, the servo circuit 150 next initiates a model reference seek to move the head 118 from the initial track to the destination track, as indicated by block 308. The operation of block 308 includes the selection of appropriate current, velocity and position reference signals Iref, Vref and Xref. respectively through appropriate scaling of the reference curves 270, 280 and 290 of FIG. 5. Once selected, these values are sequentially output at each multi-rate period during the seek on paths 220. 218 and 216 of FIG. 4. During the execution of the model reference seek, as indicated by decision block 310 the routine repetitively checks at each multi-rate period whether the seek has been completed; if not, the routine continues to block 312 wherein the position error Xerr is accumulated by the accumulator 250 and the routine loops back to decision block 310. During the execution of blocks 310 and 312, an accumulated position error "AXerr" is determined using the following relationship:

$$AXerr=AXerr+Xerr \quad (4)$$

where the accumulated position error, AXerr, which is initially set to zero (by the operation of block 306). is sequentially updated with the position error Xerr at each multi-rate period.

The routine continues until the model reference seek is completed, after which the routine passes from decision block 310 to block 314, wherein the accumulated position error AXerr is normalized by dividing by the length of the seek (i.e., the number of tracks) to determine a normalized, accumulated position error "NAXerr". Next, an adjustment value "Kadj" is determined by block 316 using the following relationship:

$$Kadj=(NAXerr-NOMXerr) \text{ (scale factor)} \quad (5)$$

where NOMXerr is a nominal value for the position error associated with a desired gain for the servo circuit 150 and the scale factor is a value used to control the convergence of the adjustment of the gain Kp. Both of these terms will be discussed in greater detail below.

Once the adjustment value Kadj is determined, the routine of FIG. 6 proceeds to block 318, wherein the gain Kp is adjusted to a new value as follows:

$$Kp=PREVKp-Kadj \quad (6)$$

where Kp is the new value for the gain block 236, PREVKp is the previous (existing) value for the gain Kp and Kadj is determined by equation (5). Thus, the new value for Kp is determined by subtracting the adjustment value Kadj from the previous value of the gain PREVKp. Accordingly, in block 318 the new value for the gain Kp is provided by the accumulator 250 (FIG. 4) to the gain block 236 and it will be understood that the operation of block 318 includes the closing of the switch 254 so as to allow the transmission of the new gain Kp to the gain block 236.

Figure 7:
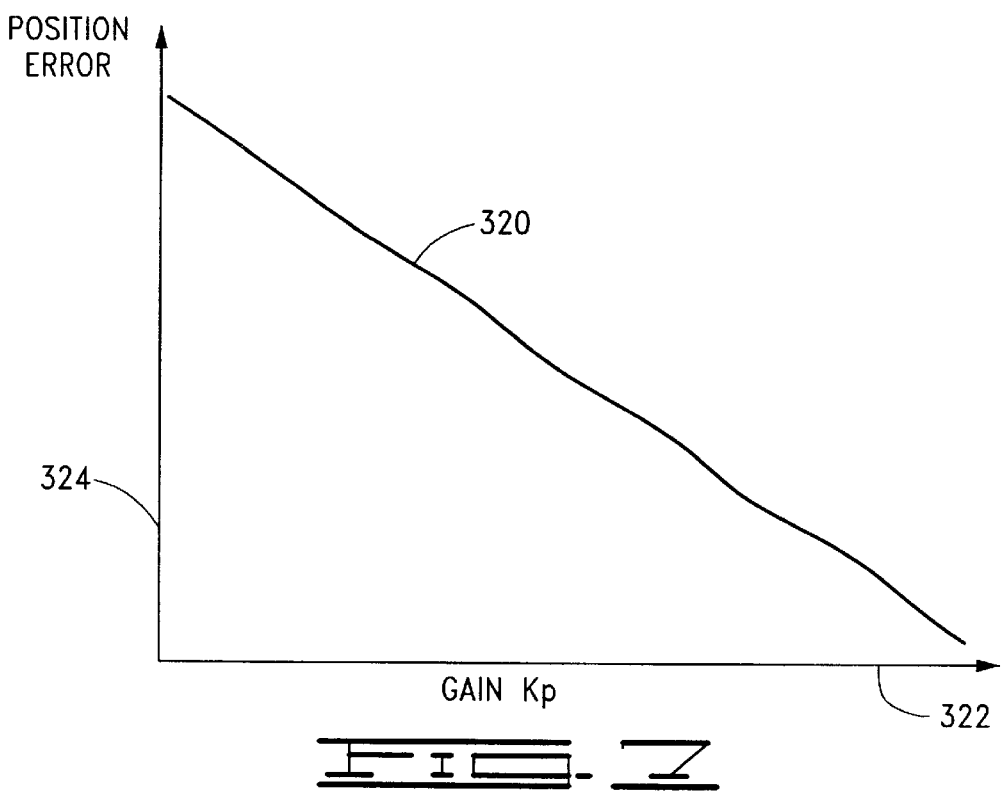
FIG. 7 provides a graphical representation of the nominal relationship between position error and gain of the servo circuit of FIG. 3.

Referring now to FIG. 7, shown therein is a graphical representation of the nominal relationship between position error and gain Kp for the disc drive 100. More particularly, FIG. 7 provides a curve 320 plotted against an x-axis 322 indicative of gain Kp and a y-axis 324 indicative of position error. From FIG. 7, it can be seen that a generally linear relationship exists between the gain Kp and the position error, with the error generally decreasing with increases in gain.

For reference, the curve 320 was obtained by sequentially varying the gain Kp and determining the nominal position error over a plurality of seeks. Hence, the relationship between gain and error will vary somewhat depending upon the characteristics each particular disc drive. Moreover, it has been found that the relationship between gain and error for each drive can vary depending upon the direction of a seek (whether toward the inner or outer diameter of the disc 108), although such differences generally diminish with increases in seek length.

In the practice of the preferred embodiment, a nominal value of gain Kp is initially selected for the disc drive 100 based upon a variety of factors, including for example, the desired robustness of the servo circuit 150 in view of off-track errors caused by vibration and shock inputs. Once the nominal gain Kp is selected, the nominal value for the accumulated position error can be determined from data such as shown in FIG. 7 and this value is used as the value NOMXerr of equation (5) and block 316 of FIG. 6.

Figure 8:
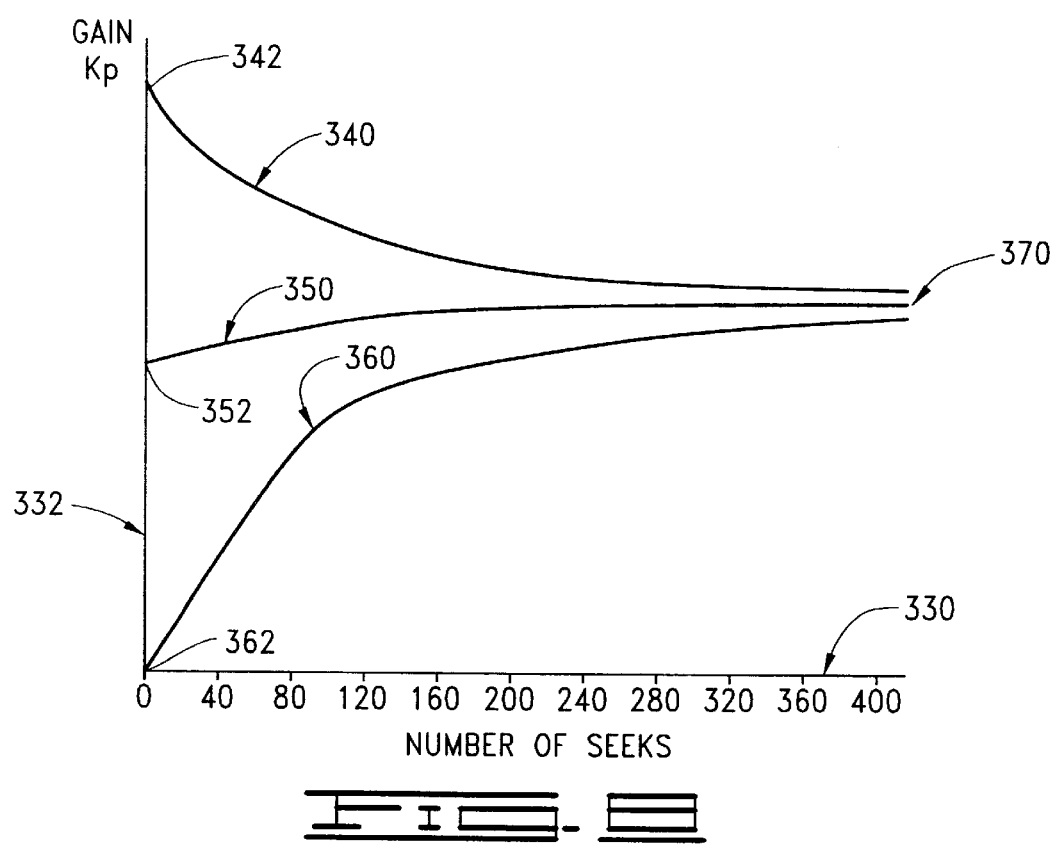
FIG. 8 provides a graphical representation of the convergence of the gain to an optimal value over a range of initial values for the gain, in accordance with the execution of the routine of FIG. 6 over a plurality of model reference seeks.

Referring now to FIG. 8, shown therein is a graphical representation of the convergence of various initial values of the gain Kp to an optimal value. FIG. 8 includes an x-axis 330 indicative of a total number of model reference seeks performed by the disc drive 100 and a y-axis 332 indicative of the relative values of the gain Kp.

Against the axes 330, 332 are plotted three different convergence curves; a first curve 340 beginning at an initial, high value for Kp (at point 342), a second curve 350 beginning at an initial, intermediate value for Kp (at point 352) and a third curve 360 beginning at an initial, low value for Kp (at point 362). Although initial values for the gain Kp were selected over a relatively large range, over a number of successive seeks the values all converge to near an optimum value for the gain Kp, generally indicated at 370. The rate of convergence for each of these curves is determined through the selection of the scale factor of equation (5) and block 316 of FIG. 6. Although each of the measurements corresponding to the graph of FIG. 8 utilized the same scale factor, it will be recognized that the selection of a smaller scale factor will generally decrease the rate of convergence, whereas selection of a larger scale factor will generally increase the rate of convergence. However, selection of a larger scale factor will generally reduce instabilities that might arise during the convergence. The manner in which preferred embodiments utilize model reference seeks to arrive at final, adaptively derived servo gains Kp will be discussed in the next section.

It is contemplated that the routine of FIG. 5 will be performed continually during the operation of the disc drive 100, so that adjustments are made to the gain Kp after the completion of each model reference seek. As most seeks in a disc drive are typically fairly short in length and disc drives spend a relatively significant amount of time seeking from track to track during read and write operations, it is contemplated that such adjustments to the gain Kp will occur on a sufficiently frequent basis during operation to maintain the gain at or near an optimal level.

However, it is further contemplated that the routine of FIG. 6 can be advantageously utilized as an additional calibration routine during idle periods of time for the disc drive 100, so that further adjustments in the servo gain Kp can be performed when the disc drive is not being utilized to transfer data between the discs 108 and the host computer 140. Such use has the advantage of ensuring that changes in environmental conditions during such idle periods do not result in large errors in the response of the servo circuit 150 once the disc drive 100 once again initiates data transfer operations.

Adaptive Servo Gain Convergence

The foregoing discussion of model reference seeks provides the necessary framework to now discuss more detailed aspects of preferred embodiments of the present invention, which involve an adaptive servo gain convergence methodology to enable more efficient derivation of the servo gain Kp. As previously discussed, model reference seeks are utilized to perform short seeks (such as 100 tracks or less) and the use of the accumulation function allows the disc drive to adapt the value of the servo gain Kp over time. It will be readily apparent that having a proper value of servo gain is desirable, since the servo gain is not only used during the execution of model reference seeks, but also for other operations as well, such as longer, velocity-controlled seeks as well as during track following (fine control) operations.

Figure 9:
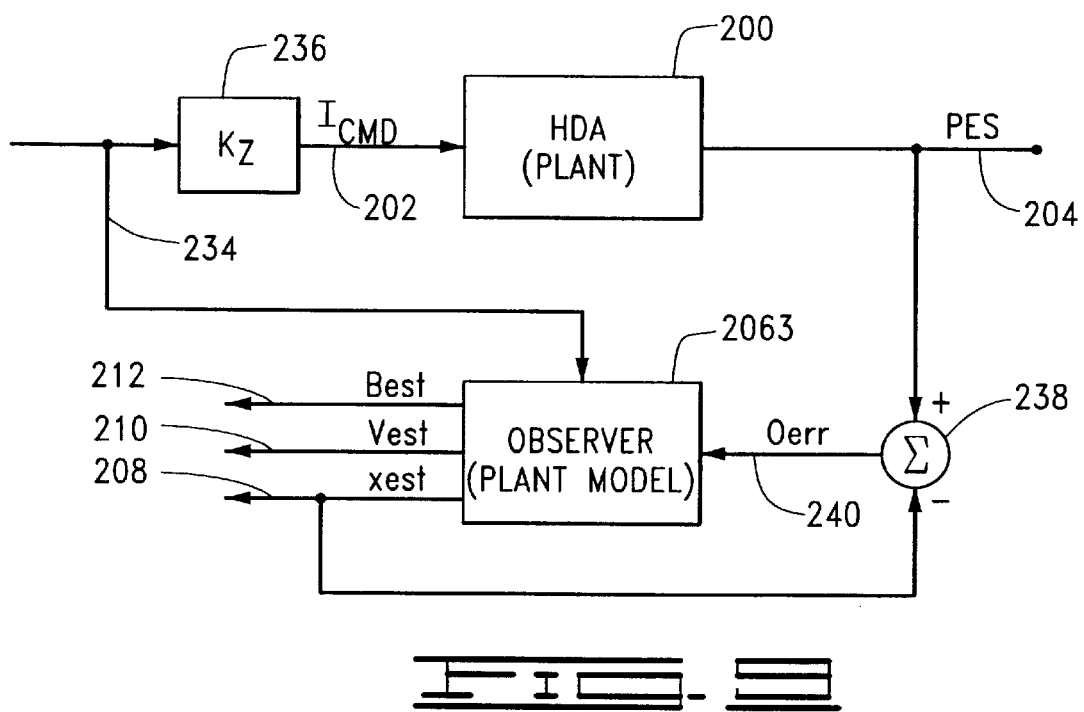
FIG. 9 is a portion of a control diagram similar to FIG. 4, showing the use of a gain Kz for the gain block 236, with the gain Kz adapted by zone on the disc recording surfaces.

Referring briefly again to FIG. 4, it will be noted that the adapted servo gain Kp is used by the servo gain block 236 to generate the current command Icmd signal to the plant 200, and among other things, serves to maintain the operation of the observer 206 nominally that of the plant 200. The actual servo gain applied by the servo gain block 236, however, is not constant across the radii of the discs 106; rather, the servo gain is adjusted to account for variations in torque characteristics for the VCM 124 (FIG. 1). Hence, FIG. 9 provides a portion of a control diagram similar to FIG. 4, except that FIG. 9 shows a servo gain Kz being applied by the servo gain block 236, with the servo gain Kz determined in relation to the gain Kp based on the location of the selected head 118 with respect to the corresponding disc recording surface. For reference, Kp is also referred to herein as a "base servo gain."

The need for adaptation of the servo gain Kz by position can be understood with a review of FIG. 10, which provides a graphical representation of a torque constant curve 400 for the VCM 124, plotted against an x-axis 402 indicative of disc position (from outer diameter, OD, to inner diameter, ID) and a y-axis 404 indicative of torque constant amplitude. As will be recognized, torque constant is a scalar value indicative of the torque output (force per distance) per current input; in other words, the torque achieved on the actuator 110 for a particular amount of current applied to the actuator coil 126. To maintain consistent servo performance across disc radii, higher servo gains are applied where the torque is lower and lower servo gains are applied where the torque is higher.

The torque constant curve 400 is shown to generally take a second order (parabolic) shape, with lower values near the disc ID and OD and higher values near mid-portions of the disc radius. This general shape is caused by a number of factors, including the fact that the magnetic flux density is somewhat lower near the edges of the permanent magnets 128 since the magnetic flux lines between the oppositely facing magnets will tend to bend outwardly at these locations. Additional factors affecting torque characteristics include imperfections in the field strengths of the permanent magnets 128 and mechanical assembly tolerances necessary to support large scale manufacturing. Thus, such effects can result in localized deviations and asymmetries along the curve, but such have been omitted for clarity. For reference, VCM torque variation and compensation techniques are discussed in U.S. Pat. No. 4,835,633 issued to Edel et al.

It will be noted the x-axis 402 of FIG. 10 is divided into a total of 17 zones (from 0 to 16), with each zone comprising a number of tracks having the same number of user data blocks. Such zone based recording (ZBR) techniques increase the data storage capacity of the disc drive and are discussed in, for example, U.S. Pat. No. 4,799,112 issued to Bremmer et al., assigned to the assignee of the present invention. Of course, the use of ZBR is not necessarily required in the practice of the present invention, but is provided for purposes of disclosing preferred embodiments thereof.

FIG. 11 provides a corresponding graphical representation of servo gains Kz (identified as Kz0 to Kz16) across the disc surfaces, plotted against an x-axis 406 indicative of disc position and a y-axis 408 indicative of servo gain amplitude. As can be seen from FIG. 11, a single value of gain Kz is applied for all of the tracks in each zone, with zones 0 and 16 having the largest amounts of servo gain and zone 8 having the lowest amount of servo gain. It will be noted that actual values of Kz may not necessarily exhibit such symmetric characteristics as set forth by FIG. 11.

The particular value of Kz for each zone is determined by combining the base servo gain Kp with a zone factor (referred to as "ZTAB") which is inversely proportional to the torque of the VCM 124, such as in accordance with the following relationship:

$$Kz = Kp(ZTAB) \qquad (7)$$

Other combinations can be readily employed such as, for example, setting Kz equal to the product of Kp and (1+ZTAB). ZTAB represents a number of values which are arranged in a table by head/zone combination and individually utilized by the servo processor 156 (FIG. 3) during subsequent disc drive operation, with the appropriate ZTAB value selected for the particular zone over which the selected head is disposed.

The ZTAB values are determined in a manner known in the art, such as described by U.S. Pat. No. 5,835,302 issued to Funches et al., assigned to the assignee of the present invention. For reference, the Funches U.S. Pat. No. 5,835,302 reference arrives at a torque compensation factor for each zone through the use of bidirectional seeks in each zone.

More particularly, each head is selected and positioned over each corresponding zone in turn. The head is moved from one zone boundary to the other by applying a constant current of selected magnitude to the actuator coil 126 for a selected duration of time; a torque factor is determined by dividing a nominal number of tracks that the head should have passed during the application of the current by the actual number of tracks that were in fact passed during the application of the current. By calculating and averaging such factors for seeks in both directions across the zone, a torque capability factor can be determined which indicates the actual torque capability for the voice coil motor for the zone. While generally suited for use in conjunction with embodiments disclosed herein, it will be understood that the present invention as claimed below is not necessarily limited to such an approach.

It will be noted that when optimum ZTAB values are obtained for modeling the VCM torque, then the Kp gain will nominally converge to the same value, regardless of head position. In other words, one value of Kp is used for each disc surface, with the particular servo gain Kz for each zone derived therefrom. It follows that it is important to maintain Kp at an optimum value to ensure proper servo performance across the disc surfaces. Since the base servo gain Kp is preferably determined using the aforementioned scale factor of equation (5), a smaller scale factor would be desirable to ensure that the gain converges and is maintained at the proper value with little variation; however, this can undesirably add to the required processing time.

Accordingly, the scale factor, abbreviated "SF," is made variable and converges from an initial large value to a final, nominal value. Use of a large initial value of SF means that the Kp gain will quickly adapt to the general vicinity of the final gain, after which use of a smaller SF will be used to facilitate smooth, controlled convergence to the final gain. This is preferably accomplished by adjusting the value of SF for each of the successive head position operations during which Kp is converged, using the following relationship:

$$NEWSF=PREVSF+C1 \ (NOMSF-PREVSF) \qquad (8)$$

where NEWSF is the updated value of SF, PREVSF is the value of SF used during the immediately proceeding iteration, NOMSF is a nominal value for SF (to which SF ultimately converges), and C1 is a convergence constant which controls the rate of the convergence from the initial scale factor value to the final scale factor value.

FIG. 12 has been provided to generally illustrate convergence rates for a variety of different values of the convergence constant C1, using an initial value of SF of 0.75 and a NOMSF value of 0.3. More particularly, FIG. 12 sets forth four curves 410, 412, 414 and 416, plotted against a common x-axis 418 indicative of the number of seeks (convergence iterations) and a common y-axis 420 indicative of scale factor magnitude.

The curves 410, 412, 414 and 416 were plotted using convergence constant C1 values of 0.1, 0.25, 0.5 and 0.75, respectively. From FIG. 12, it will be noted that the slowest scale factor convergence occurred with curve 410 (C1=0.1) and the fastest scale factor convergence occurred with curve 416 (C1=0.75). The particular value of C1 should be selected based on the requirements of a given application. Generally, a slower convergence (reduction) of the scale factor will yield a faster convergence of the servo gain, as relatively larger scale factors will provide larger initial values of the gain adjustment factor Kadj. Care should be taken, however, since too slow a convergence of the scale factor may in some cases result in over-correction, that is, undesired oscillation of the servo gain about the final value.

Figure 13:
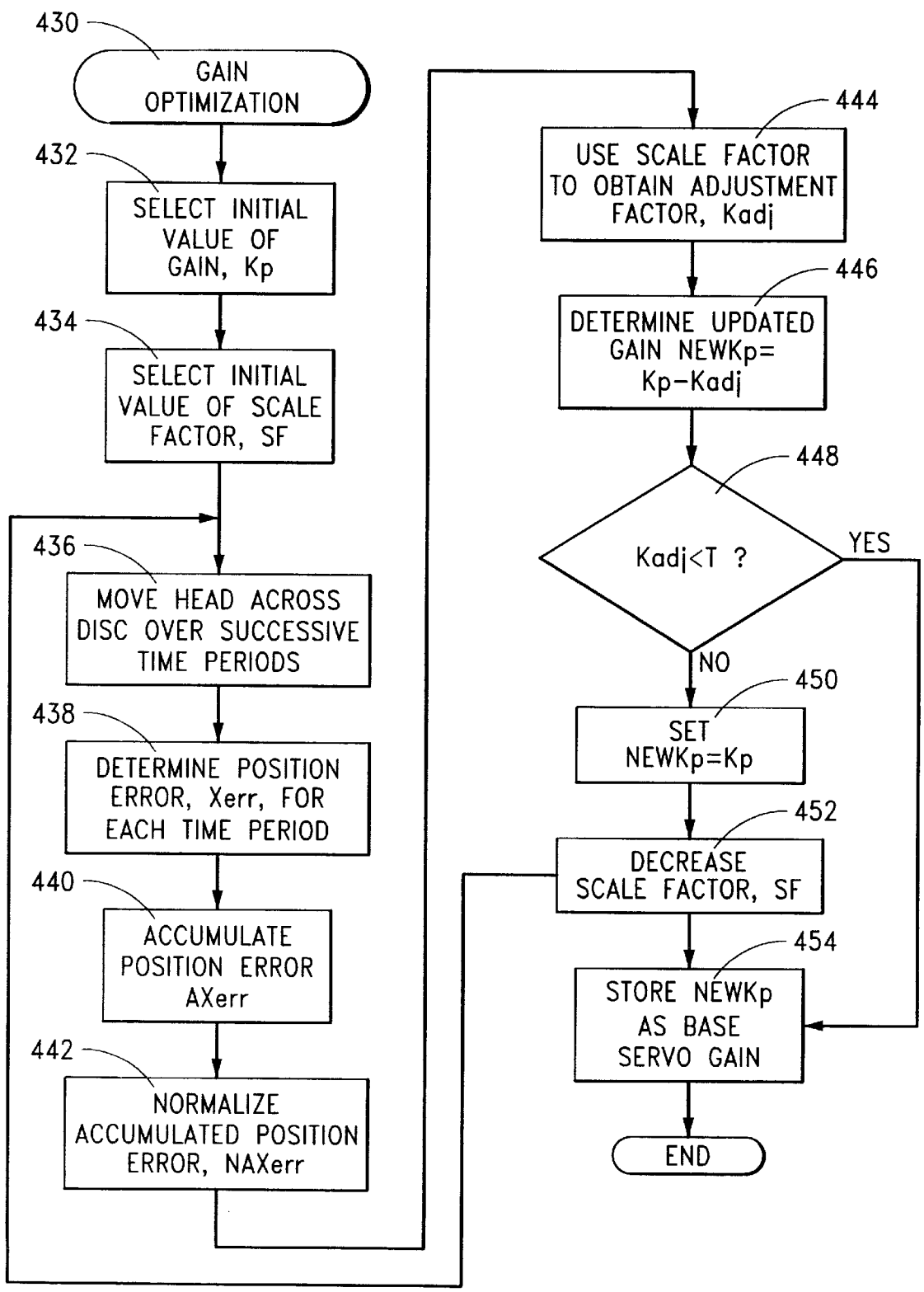
FIG. 13 is a flow chart for a GAIN OPTIMIZATION routine, generally representative of programming utilized by the servo processor of FIG. 3 to select an optimal base servo gain in accordance with preferred embodiments of the present invention.

Referring now to FIG. 13, shown therein is a flow chart for a GAIN OPTIMIZATION routine 430, representative of programming utilized by the servo processor 156 to select an optimum base servo gain Kp. It will be noted that the routine of FIG. 13 involves dual convergence; overall convergence to the final, optimal value of Kp, which is significantly aided by the concurrent convergence of the scale factor SF.

Beginning at block 432, the servo processor 156 selects an initial value of gain Kp. This initial value of gain can be a default value, or the most recently utilized value obtained during previous disc drive operations. It will be understood that the initial value is preferably stored in non-volatile memory and retrieved by the servo processor 156 during this step.

Next, at block 434, the servo processor 156 selects an initial value for the scale factor SF which, as mentioned above, will cause the gain Kp to move quickly from the initial value to near the final value. Once initial values for the gain Kp and the scale factor are selected, the heads 118 are moved a selected distance across the discs 108 over a succession of time periods, as indicated by block 436. Preferably, this involves execution of a model reference seek, as represented by block 308 of FIG. 6 above, although the present invention is not so limited. It will be noted that the operation of block 436 will include selecting and using an appropriate zone gain Kz based on the initial value of gain Kp, in accordance with equation (7), for example.

Continuing with FIG. 13, block 438 illustrates the determination of position error Xerr for each of the time periods of block 436. That is, as the heads 118 are moved from one track to another, the position error Xerr is calculated with respect to the difference between the reference position Xref and the estimated position Xest. As mentioned above, estimated position Xest is provided through the operation of the observer 206. Reference position Xref is provided through the operation of the reference generator 214. An accumulated position error AXerr is determined by block 440 as the sum of the position errors Xerr of block 438 according to equation (4) discussed above. It will be noted that the combined operation of blocks 438 and 440 is similar to the operation of block 312 of FIG. 6 described above.

Continuing with FIG. 13, the operation of block 442 involves normalizing the accumulated position error AXerr with respect to the distance the head 118 was moved during block 436. If a model reference seek is used, then the operation of block 442 will be similar to the operation of block 314 of FIG. 6 described above. The resulting normalized accumulated position error, NAXerr, is representative of the performance of the servo circuit 150 for the movement of the heads 118 the selected distance over the disc 108.

Block 444 demonstrates the calculation of a gain adjustment factor Kadj. Using equation (5) described above, the gain adjustment factor Kadj is formed as the result of the difference between the normalized accumulated position error NAXerr and a nominal position error NOMXerr, divided by the scale factor selected during the operation of block 434. As previously discussed, NOMXerr is a nominal value for the position error associated with a desired gain for the servo circuit 150. Once a gain adjustment value Kadj is obtained, an updated gain NEWKp is calculated at block 446. More particularly, block 446 illustrates the calculation of the updated gain NEWKp as the difference between the existing gain Kp and the gain adjustment value Kadj, similar to the operation of block 318 in FIG. 6.

The routine of FIG. 13 continues to decision block 448, which compares the gain adjustment value Kadj to a predetermined convergence threshold T. Preferably, the convergence threshold T is selected to be near zero to force convergence within strict tolerances. As the iterative GAIN OPTIMIZATION process 430 continues, the difference between the convergence threshold T and the gain adjustment value Kadj will diminish, but unless the initial value of gain Kp selected by block 434 happens to be substantially equal to the final, optimal value, Kadj will initially be substantially greater than T. Hence, the flow will pass to block 450 which identifies the NEWKp gain determined by block 446 as an updated gain Kp. Next, block 452 operates to reduce the scale factor SF, preferably in accordance with equation (8). As discussed above, reducing the scale factor SF lessens the aggressiveness of the convergence of the gain Kp.

Once a reduced scale factor SF and the new value for the gain Kp have been selected, the flow returns to block 436, where the head is again moved across the disc 108, this time using a zone gain Kz calculated from the updated gain Kp. The iterative loop continues until the value of the gain adjustment value Kadj becomes less than the threshold convergence value T. Once the gain adjustment value Kadj is less than the convergence threshold T, the decision block 448 directs the process to block 454, which stores the new gain value NEWKp as the final base servo gain Kp. Once the base servo gain Kp is stored, it is thereafter used, as discussed above in reference to equation (7), to determine the zone dependent servo gain Kz for normal servo operations in the corresponding zones. The GAIN OPTIMIZATION routine 430 is preferably performed during manufacture and at other suitable times during disc drive operation, such as but not limited to, power-up and disc drive idle times.

Figure 14:
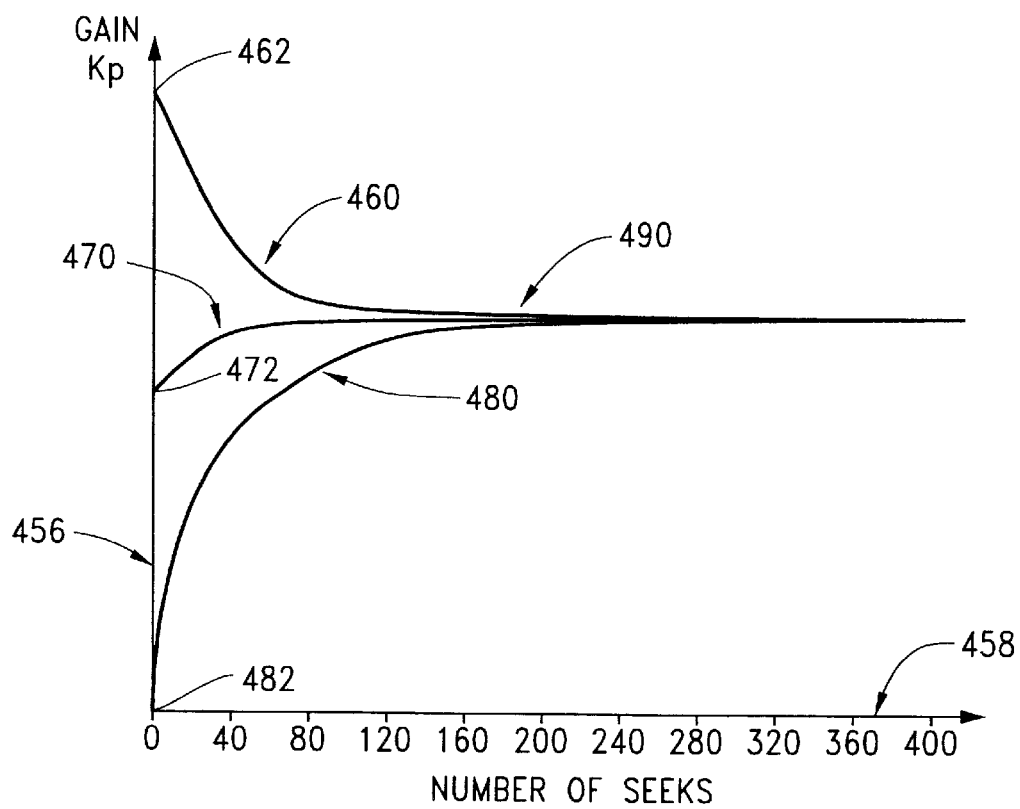
FIG. 14 is a graphical representation of the convergence of the servo gain to the optimal value over a range of initial values for the gain, illustrating the significant reduction in the amount of time required to obtain the optimal gain value using the routine of FIG. 13, as compared to the convergence characteristics previously shown in FIG. 8.

Now referring to FIG. 14, shown therein is a graphical representation of the convergence of various initial values of the gain Kp to an optimal value in accordance with the preferred embodiment disclosed herein. FIG. 14 is substantially similar to FIG. 8 discussed above. However, it is significant that FIG. 14 shows a graphical representation of the more rapid convergence of Kp using the dual convergence of the scale factor SF and the gain Kp.

FIG. 14 includes a y-axis 456 indicative of the relative values of the gain Kp and an x-axis 458 indicative of a total number of model reference seeks performed by the disc drive 100. Against the axes 456, 458 are plotted three different convergence curves: a first curve 460 beginning at an initial, high value for Kp (at point 462), a second curve 470 beginning at an initial, intermediate value for Kp (at point 472), and a third curve 480 beginning at an initial, low value for Kp (at point 482). Although initial values for the gain Kp were selected over a relatively large range, over a number of successive seeks the values all converge to a near optimum value for the gain Kp, generally indicated at pont 490.

Comparing the graphical representations of FIG. 14 and FIG. 8, it is apparent that converging the variable scale factor SF significantly increases the rate of convergence for gain Kp. Although not explicitly shown in FIG. 14, as the gain Kp converges from an initial point, the scale factor SF is assigned an initial, high value. As the convergence of Kp nears an optimum value, the value of the scale factor SF is reduced, thereby more accurately controlling the final iterations of gain Kp convergence.

The graph depicted in FIG. 14 is merely an illustration of possible convergence results using a preferred embodiment of the present invention. It is understood that the overall rates of convergence of the gain Kp shown in FIG. 14 can be increased by using smaller values of C1, and decreased using larger values of C1.

The foregoing discussion has contemplated use of a multiplication scale factor less than one (see equation (5) and FIG. 12). It will be apparent that the scale factor could be readily modified to become a divisor, in which case larger values would provide lower rates of gain convergence. Such modifications are well within the ability of those skilled in the art and are contemplated as being within the spirit and scope of the claims.

In view of the foregoing, it will now be understood that the present invention is directed to an apparatus and method for optimizing servo gain in a disc drive.

In accordance with preferred embodiments, a disc drive 100 includes a head 118 adjacent a recording surface of a rotatable disc 108 and a voice coil motor 124 which is coupled to the head. A servo circuit 150 applies current to the voice coil motor to controllably position the head with respect to the recording surface, the servo circuit comprising a servo processor 156 which utilizes an internal gain to control a magnitude of the current.

The servo processor optimizes the internal gain by selecting an initial value of gain for the internal gain. Next, a gain convergence operation is performed which comprises repeatedly positioning the head and accumulating position error over a successive number of passes to iteratively converge the internal gain from the initial value of gain to a final value of gain which provides optimal performance by the servo circuit. The gain convergence operation utilizes a scale factor during each of the successive number of passes, the scale factor iteratively converging over the successive number of passes from an initial value to a final, nominal value.

A new value for the scale factor is determined during each successive pass during the gain convergence operation in relation to a combination of a previous value for the scale factor during a previous pass, and a product of a convergence constant and a difference between the nominal value for the scale factor and the previous value for the scale factor. The magnitude of the convergence constant controls the rate of convergence of the scale factor from the initial value to the nominal value, and hence the rate of convergence of the gain from the initial value of gain to the final value of gain.

The final value of gain is a base gain which is further adapted to account for variations in torque capability of the voice coil motor. Preferably, the disc recording surface is divided into a number of concentric zones with each zone comprising a plurality of tracks. The servo processor proceeds to determine a torque capability factor for each zone which is inversely proportional to torque capability of the voice coil motor in each zone.

Next, the servo processor obtains a zone servo gain which is used for each zone in relation to a combination of the base servo gain and the associated torque capability factor, the zone servo gain used to control the magnitude of the current applied to the voice coil motor. Because magnetic flux density of the voice coil motor is typically lower near edges of permanent magnets of the motor and higher near intermediate portions of the magnets, the zone servo gain for zones disposed near innermost and outermost diameters of the recording surface are greater than the zone servo gain for zones disposed near intermediate portions of the recording surface.

Further, the gain convergence operation wherein the head is repetitively moved across the recording surface is preferably characterized as comprising a number of successively performed model reference seeks, which comprise short seeks (typically 100 tracks or less). Each model reference seek utilizes a reference current signal indicative of the current to be applied to the voice coil motor having a shape characterized as a modified one minus cosine waveform.

For purposes of the appended claims, the terms "circuit" and "circuitry" will be understood consistently with the foregoing discussion to include both hardware and software (firmware) implementations. The terms "converge," "convergence" and "converging" will be understood consistently with the foregoing discussion to describe a repetitive operation whereby a value begins at an initial value and asymptotically transitions to a final value over a number of iterations.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A disc drive, comprising:

a head adjacent a recording surface of a rotatable disc;

a voice coil motor coupled to the head; and a servo circuit which applies current to the voice coil motor to controllably position the head with respect to the recording surface, the servo circuit comprising a servo processor utilizing an internal gain to control a magnitude of the current, the gain optimized by the servo processor executing steps of:

(a) selecting an initial value of gain for the internal gain; and (b) performing a gain convergence operation comprising repeatedly positioning the head and accumulating position error a successive number of passes to iteratively converge the internal gain from the initial value of gain to a final value of gain which provides optimal performance by the servo circuit, the gain convergence operation utilizing a scale factor during each of the successive number of passes, the scale factor iteratively converging over the successive number of passes from an initial value to a final, nominal value.

2. The disc drive of claim 1, wherein the disc recording surface is divided into a number of concentric zones with each zone comprising a plurality of tracks, wherein the final value of gain is characterized as a base servo gain, and wherein the servo processor further executes steps of:

(c) determining a torque capability factor for each zone which is inversely proportional to torque capability of the voice coil motor in each zone; and (d) obtaining a zone servo gain for each zone in relation to a combination of the base servo gain and the associated torque capability factor, the zone servo gain used to control the magnitude of the current applied to the voice coil motor when the head is adjacent the associated zone, wherein the zone servo gain for zones disposed near innermost and outermost diameters of the recording surface are greater than the zone servo gain for zones disposed near intermediate portions of the recording surface.

3. The disc drive of claim 1, wherein a new value for the scale factor is determined during each successive pass in relation to a combination of a previous value for the scale factor during a previous pass, and a product of a convergence constant and a difference between the nominal value for the scale factor and the previous value for the scale factor, with the convergence constant controlling convergence rate of the scale factor from the initial value to the nominal value.

4. The disc drive of claim 3, wherein the new value for the scale factor is characterized as NEWSF, the previous value for the scale factor is characterized as PREVSF, the nominal value for the scale factor is characterized as NOMSF, the convergence constant is characterized as C1, and wherein the new value for the scale factor is determined in accordance with the relation NEWSF=PREVSF+C1(NOMSF−PREVSF).

5. A disc drive, comprising:

a servo circuit which applies current to a voice coil to position a head adjacent a recording surface of a rotatable disc; and convergence means for converging a scale factor from an initial scale factor value to a final scale factor value to control a rate of convergence of a gain from an initial gain value to an optimal gain value, the optimal gain value used by the servo circuit to control magnitude of the current applied to the voice coil motor.

6. A method for selecting an optimal value of gain for use by a disc drive servo circuit which positions a head adjacent a recording surface of a rotatable disc by applying current to a voice coil motor, comprising steps of:

(a) selecting an initial value of gain;

(b) using the initial value of gain to controllably move the head a selected distance across the recording surface over a succession of time periods;

(c) determining a position error for each of the time periods in relation to a reference position and an estimated position of the head;

(d) determining an accumulated position error in relation to a sum of the position errors;

(e) generating a normalized accumulated position error in relation to the accumulated position error and the selected distance;

(f) obtaining a gain adjustment value in relation to a combination of a scale factor and a difference between the normalized accumulated position error and a nominal position error associated with a nominal value of gain for the servo circuit;

(g) determining an updated value of gain in relation to a combination of the first value of gain and the gain adjustment value; and (h) successively repeating steps (b) through (g) to iteratively converge to a final updated value of gain which provides optimal servo circuit performance, wherein the scale factor of step (f) is sequentially decreased for successive executions of steps (b) through (g) to reduce elapsed time required to converge to the final updated value of gain.

7. The method of claim 6, wherein the final updated value of gain is characterized as a base servo gain, and wherein the method further comprises steps of:

(i) dividing the recording surface into a number of concentric zones, each zone comprising a plurality of tracks;

(j) determining a torque capability factor for each zone which is inversely proportional to torque capability of the voice coil motor in each zone; and (k) obtaining a zone servo gain for each zone in relation to a combination of the base servo gain and the associated torque capability factor, the zone servo gain used to control a magnitude of current applied to the voice coil motor, wherein the zone servo gain for zones disposed near innermost and outermost diameters of the recording surface are greater than the zone servo gain for zones disposed near intermediate portions of the recording surface.

8. The method of claim 6, wherein during a first execution of steps (b) through (g) the scale factor of step (f) has an initial value, and wherein during successive executions of steps (b) through (g) the scale factor is successively decreased to iteratively converge to a nominal value for the scale factor.

9. The method of claim 8, wherein a new value for the scale factor is determined during each successive execution of steps (b) through (g) in relation to a combination of a previous value for the scale factor, and a product of a convergence constant and a difference between the nominal value for the scale factor and the previous value for the scale factor, with the convergence constant controlling convergence rate of the scale factor from the initial value to the nominal value.

10. The method of claim 9, wherein the new value for the scale factor is characterized as NEWSF, the previous value for the scale factor is characterized as PREVSF, the nominal value for the scale factor is characterized as NOMSF, the convergence constant is characterized as C1, and wherein the new value for the scale factor is determined in accordance with the relation NEWSF=PREVSF+C1(NOMSF−PREVSF).

* * * * *